United States Patent
Epstein et al.

(10) Patent No.: US 7,813,537 B2
(45) Date of Patent: Oct. 12, 2010

(54) MOTION-GUIDED SEGMENTATION FOR CINE DENSE IMAGES

(75) Inventors: Frederick H Epstein, Charlottesville, VA (US); Ernesta M Meintjes, Cape Town (ZA); Bruce S Spottiswoode, Cape Town (ZA)

(73) Assignees: Siemens Medical Solutions USA, Inc., Malvern, PA (US); University of Virginia Patent Foundation, Charlottesville, VA (US); University of Cape Town, Rondebosch (ZA)

( * ) Notice: Subject to any disclaimer, the term of this patent is extended or adjusted under 35 U.S.C. 154(b) by 812 days.

(21) Appl. No.: 11/748,204

(22) Filed: May 14, 2007

(65) Prior Publication Data

US 2008/0015428 A1    Jan. 17, 2008

Related U.S. Application Data

(60) Provisional application No. 60/800,353, filed on May 15, 2006.

(51) Int. Cl.
    *G06K 9/00* (2006.01)
(52) U.S. Cl. .................. 382/128; 382/173; 382/108; 382/112; 382/141; 382/152; 348/91; 348/92; 348/125; 348/133; 356/237.1; 356/394; 356/398; 600/413; 600/410; 600/407
(58) Field of Classification Search ............ 382/128, 382/173, 23, 129, 130, 131, 132, 133, 168, 382/171, 181, 216, 201, 219, 232, 256, 274, 382/276–277; 600/420, 419; 378/50, 20, 378/21, 23
See application file for complete search history.

(56) References Cited

U.S. PATENT DOCUMENTS

| | | | |
|---|---|---|---|
| 5,672,969 A | 9/1997 | Zhou et al. | |
| 5,997,883 A | 12/1999 | Epstein et al. | |
| 6,031,374 A | 2/2000 | Epstein et al. | |
| 6,144,200 A | 11/2000 | Epstein et al. | |
| 6,718,055 B1 * | 4/2004 | Suri | 382/128 |
| 6,892,089 B1 * | 5/2005 | Prince et al. | 600/410 |

(Continued)

OTHER PUBLICATIONS

Axel L. And Dougherty L, "MR imaging of motion with spatial modulation of magnetization," *Radiology*, vol. 171, pp. 841-845, 1989.

(Continued)

*Primary Examiner*—Wes Tucker
*Assistant Examiner*—Nancy Bitar
(74) *Attorney, Agent, or Firm*—Donald B. Paschburg

(57) ABSTRACT

Myocardial tissue tracking techniques are used to project or guide a single manually-defined set of myocardial contours through time. Displacement encoding with stimulated echoes (DENSE), harmonic phase (HARP) and speckle tracking is used to encode tissue displacement into the phase of complex MRI images, providing a time series of these images, and facilitating the non-invasive study of myocardial kinematics. Epicardial and endocardial contours need to be defined at each frame on cine DENSE images for the quantification of regional displacement and strain as a function of time. The disclosed method presents a novel and effective two dimensional semi-automated segmentation technique that uses the encoded motion to project a manually defined region of interest through time. Contours can then easily be extracted for each cardiac phase.

20 Claims, 10 Drawing Sheets

U.S. PATENT DOCUMENTS

| | | | |
|---|---|---|---|
| 7,460,699 B2 * | 12/2008 | O'Donnell et al. | 382/128 |
| 7,480,407 B2 * | 1/2009 | Imamura et al. | 382/173 |
| 7,495,438 B2 * | 2/2009 | Prince et al. | 324/309 |
| 7,672,540 B2 * | 3/2010 | Sun et al. | 382/294 |
| 7,689,021 B2 * | 3/2010 | Shekhar et al. | 382/131 |

OTHER PUBLICATIONS

Bryant D., Payne J., Firmin D., and Longmore D., "Measurement of flow with NMR imaging using gradient pulse and phase difference technique," *Journal of computer assisted tomography*, vol. 8, No. 4, pp. 588-593, 1984.

Fischer S. E., McKinnon G. C., Scheidegger M. C., Prins W., Meier D., Boesiger P., "True myocardial motion tracking," *Magnetic Resonance in Medicine*, vol. 31, pp. 401-413, 1994.

Kim D., Gilson W., Kramer C., Epstein F., "Myocardial tissue tracking with two-dimensional cine displacement-encoded MR imaging: Development and initial evaluation," *Radiology*, vol. 230, pp. 862-871, 2004.

Osman N.F., McVeigh B.R., and Prince J.L, "Imaging Heart Motion Using Harmonic Phase MRI," *IEEE Transactions on Medical Imaging*, vol. 19, No. 3, pp. 186-202, 2000.

Spottiswoode B.S., Zhong X., Meintjes E.M., Mayosi B.M., Epstein F.H., "Improved Myocardial Tissue Tracking and Strain Accuracy in Cine-Dense using Temporal Fitting", *Proc. 13$^{th}$ ISMRM*, #778, 2005:1.

Spottiswoode B.S., "Myocardial contour detection in MRI tagged images using short-range correlations of displacement fields", *SAIEE Transactions*, vol. 96, No. 2, pp. 99-105, 2005:2.

van Dijk P., "Direct cardiac MNR imaging of heart wall and blood flow velocity," *Journal of computer assisted tomography*, vol. 8, No. 3, pp. 429-436, 1984.

Wen, H. "Fully-automated masking of Displacement Encoded (DENSE) Image,s" *Proc. 22$^{nd}$ ESMRMB*, #259, 2005.

Wong, A. L. N., Liu, H., Sill, P., "Segmentation of myocardium using velocity field constrained front propagation," *Proc. 6th WACV*, pp. 84-89, 2002.

Zerhouni B.A., Parish D.M., Rogers W.J., Yang A., and Shapiro E.P., "Human heart: tagging with MR imaging—a method for noninvasive assessment of myocardial motion," *Radiology*, vol. 169, No. 1, pp. 59-63, 1988.

Abd-Elmoniem, K.Z., Osman, N.F., Prince, J.L., Stuber, M., 2005. zHARP: 3-D cardiac motion tracking from short-axis acquisitions. Proc. 13$^{th}$ ISMRM, #1649.

Abd-Elmoniem, K.Z., Stuber, M., Prince, J.L., 2006. Fast 3D dense tracking of cardiac material points using ZHARP: in-vivo validation and comparison with 3D SF-HARP. Proc. 14$^{th}$ ISMRM, #1653.

Aletras, A., Ding, S., Balaban, R., Wen, H., 1999. DENSE: displacement encoding with stimulated echoes in cardiac functional MRI. Journal of Magnetic Resonance 137, 247-252.

Axel, L., Dougherty, L., 1989. MR imaging of motion with spatial modulation of magnetization. Radiology 171, 841-845. Bryant, D., Payne, J., Firmin, D., Longmore, D., 1984. Measurement of flow with NMR imaging using gradient pulse and phase difference technique. Journal of computer assisted tomography 8(4), 588-593.

Cho, J., Benkeser, P.J., 2006. Cardiac segmentation by a velocity-aided active contour model. Computerized Medical Imaging and Graphics 30, 31-41.

Fischer, S. E., McKinnon, G. C., Scheidegger, M. C., Prins, W., Meier, D., Boesiger, P., 1994. True myocardial motion tracking. Magnetic Resonance in Medicine 31, 401-413.

Frangi, A.F., Niessen, W.J., Viergever, M.A., 2001. Three-dimensional modelling for functional analysis of cardiac images: A review. IEEE Transactions on Medical Imaging 20 (1), 2-25.

Ghiglia, D.C., Pritt, M.D., 1998. Two-dimensional phase unwrapping: theory, algorithms and software. Wiley-Interscience. ISBN: 0471249351.

Gilson, W. D., Yang, Z., French, B. A., Epstein, F. H., 2005. Measurement of myocardial mechanics in mice before and after infarction using multislice displacement-encoded MRI with 3D motion encoding. American Journal of Physiology—Heart and Circulatory Physiology 288(3), H1491-H1497.

Guttmann, M.A., Prince, J.L., McVeigh, E.R., 1994. Tag and contour detection in tagged MR images of the left ventricle. IEEE Transactions on Medical Imaging 13(1), 74-88.

Kass, M., Witkin, A., Terzopoulos, D., 1988. Snakes: Active contour models. International Journal of Computer Vision 1, 321-331. Kim, D., Gilson, W., Kramer, C., Epstein, F., 2004. Myocardial tissue tracking with two-dimensional cine displacement-encoded MR imaging: Development and initial evaluation. Radiology 230, 862-871.

Kuijer, J., Hofman, M.B., Zwanenburg, J.J., Marcus, J.T., Rossum, A.C., Heethaar, R.M., 2006. DENSE and HARP: two views on the same technique of phase-based strain imaging. In: Proceedings of the 14th ISMRM, Seattle, USA.

Li, M, Kambhamettu, C, 2002. Motion-based post processing of deformable contours. In: Proc. Indian Conference on Computer Vision, Graphics and Image Processing (ICVGIP).

Li, Y., Garson, C.D., Epstein, F.H., French, B.A., Hossack, J.A., 2006. High resolution 2-D quantification of myocardial motion abnormalities in mice using high resolution ultrasound with MRI validation. In: Proceedings of 3$^{rd}$ International Symposium on Biomedical Engineering (ISBI).

Moghaddam, A.N., Wen, H., Gharib, M., 2006. More comprehensive cardiac DENSE MR imaging by combination of short axis and long axis data. In: Proc. 14$^{th}$ ISMRM, #1652.

Moore, C.C., Lugo-Olivieri, C.H., McVeigh, E.R., Zerhouni, E.A., 2000. Three dimensional systolic patterns in the normal human left ventricle: characterization with tagged MR imaging. Radiology 214, 453-466.

Montillo, A., Metaxas, D., Axel, L., 2002. Automated segmentation of the left and right ventricles in 4-D cardiac SPAMM images. International Society and Conference Series on Medical Image Computing and Computer-Assisted Intervention (MICCAI), LNCS 2488, 620-633.

Montillo, A., Metaxas, D., Axel, L., 2003. Automated model-based segmentation of the left and right ventricles in tagged cardiac MRI. International Society and Conference Series on Medical Image Computing and Computer-Assisted Intervention (MICCAI), LNCS vol. 2878, 507-515.

Osman, N. F., McVeigh, E.R., Prince, J.L., 2000. Imaging Heart Motion Using Harmonic Phase MRI. IEEE Transactions on Medical Imaging 19(3), 186-202.

Osman, N. F., Kerwin, W. S., McVeigh, E. R., Prince, J. L., 1999. Cardiac motion tracking using Cine harmonic phase (HARP) magnetic resonance imaging. Magnetic Resonance in Medicine 42, 1048-1060.

Pan, L., Lima, J. A.C., Osman, N. F., 2003. Fast tracking of cardiac motion using 3DHARP. Proceedings of Information Processing and Medical Imaging (IPMI), LNCS 2732, 611-622.

Pan, L., Sampath, S., Prince, J. L., Stuber, M., Osman, N. F., 2005. Fast tracking of cardiac material points from SF-CSPAMM images using 3D SF-HARP. In: Proceedings of the 13th ISMRM, Miami, USA.

Pelc, N.J., Drangova, M., Pelc, L.R., 1995. Tracking of cyclic motion with phase-contrast MR velocity data. Journal of Magnetic Resonance Imaging 5, 339-345.

Peterfreund, N., 1999. The velocity snake: deformable contour for tracking in spatio-velocity space. Computuer Vision and Image Understanding 73(3), 346-356.

Sinele, K., Bennett, E., Wen, H., 2006. Automatic masking and phase unwrapping of DENSE myocardial tissue tracking images in human. Journal of Cardiovascular Magnetic Resonance 8(1), 146-147.

Spottiswoode, B.S., Zhong, X, Lorenz, C.H., Meintjes, E.M., Mayosi, B.M., Epstein, F.H., 2006. Tracking 3-D Myocardial Motion using Slice-followed Cine DENSE. Journal of Cardiovascular Magnetic Resonance, vol. 8, No. 1, pp. 80-81, Jan. 2006.

Spottiswoode, B. S., Zhong, X., Hess, A. T., Kramer, C.M., Meintjes, E. M., Mayosi, B. M., Epstein, F. H., 2007. Tracking Myocardial Motion from Cine DENSE Images using Spatiotemporal Phase Unwrapping and Temporal Fitting. IEEE Transactions on Medical Imaging 26(1), 15-30.

Stuber, M., Spiegel, M. A., Fischer, S. E., Scheidegger, M. B., Danias, P. G., Pedersen, E. M., Boesiger, P., 1999. Single breath-hold slice-followed CSPAMM myocardial tagging. Magnetic Resonance Materials in physics, Biology and Medicine 9, 85-91.

Todd Constable, R., Rath, K. M., Sinusas, A. J., Gore, J. C., 1994. Development and evaluation of tracking algorithms for cardiac wall motion analysis using phase velocity MR imaging. Magnetic Resonance in Medicine 32, 33-42. van Dijk, P., 1984. Direct cardiac MNR imaging of heart wall and blood flow velocity. Journal of computer assisted tomography 8(3), 429-436.

Wong, A.L.N., Liu, H., Shi, P., 2002. Segmentation of the Myocardium Using Velocity Field Constrained Front Propagation. Proceedings of the 6$^{th}$ IEEE Workshop on Applications of Computer Vision, p. 84.

Young, A. A., Kraitchman, D. L., Dougherty, L., Axel, L., 1995. Tracking and finite element analysis of stripe deformation in magnetic resonance tagging. IEEE Transactions on Medical Imaging 14(3), 413-421.

Zerhouni, E. A., Parish, D. M., Rogers, W. J., Yang, A. Shapiro, E. P., 1988. Human heart: tagging with MR imaging—a method for noninvasive assessment of myocardial motion, Radiology 163(1), 59-63.

Zhu, Y., Drangova, M., Pelc, N. J., 1996. Fourier tracking of myocardial motion using cine-PC data. Magnetic Resonance in Medicine 35, 471-480.

Zhong, X., Spottiswoode, B.S., Epstein, F.H., 2007. Myocardial Tissue Tracking Using Volumetric Cine DENSE with Three-dimensional Displacement Encoding: Development and Preliminary Results. To appear in: Proceedings of the 15th ISMRM, Berlin, Germany.

* cited by examiner

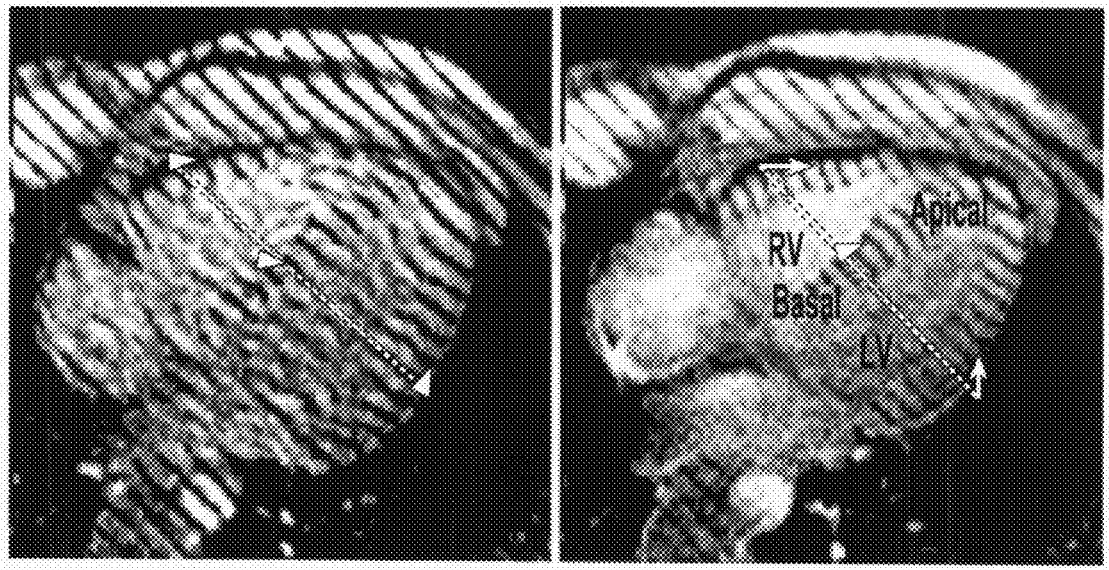
*Fig. 12A*  *Fig. 12B*
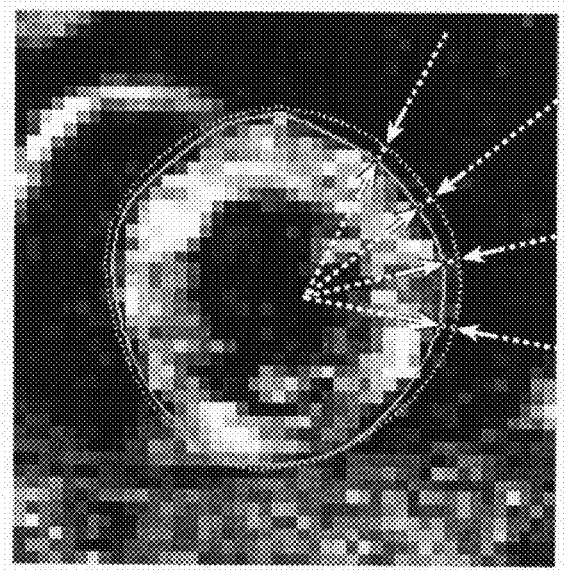
*Fig. 13*

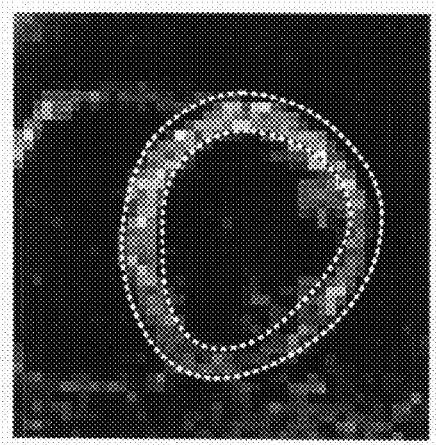 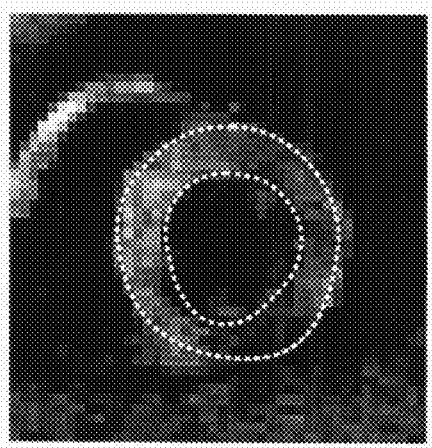
*Fig. 15A*  *Fig. 15B*
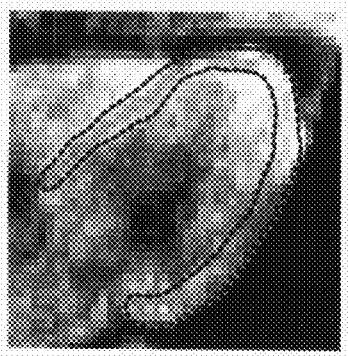 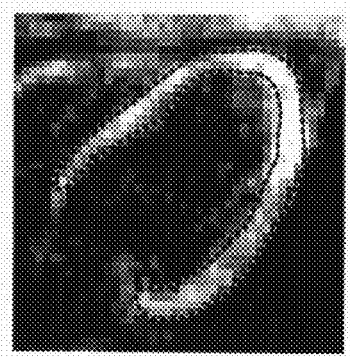 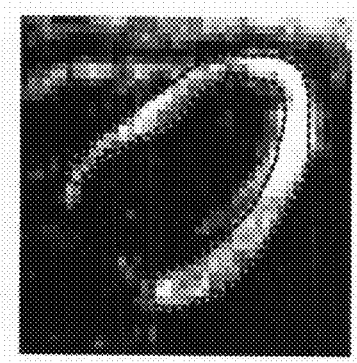
*Fig. 16A*  *Fig. 16B*  *Fig. 16C*

MOTION-GUIDED SEGMENTATION FOR CINE DENSE IMAGES

CROSS-REFERENCE TO RELATED APPLICATIONS

This is a non-provisional of provisional patent application Ser. No. 60/800,353, filed May 15, 2006 by Spottiswoode et al., the entire contents of which application is incorporated herein by reference.

FIELD OF THE INVENTION

This invention generally relates to methods for myocardial tissue tracking, and more particularly to the use of tissue tracking for projecting a single manually defined set of myocdardial contours through time to give the position of the myocardium at all cardiac phases.

BACKGROUND

A number of MRI techniques have been developed to quantify myocardial motion, including myocardial tagging (see, e.g., Zerhouni, E. A., Parish, D. M., Rogers, W. J., Yang, A. Shapiro, E. P., "Human heart: tagging with MR imaging—a method for noninvasive assessment of myocardial motion," *Radiology* 163(1), 59-63, 1998; Axel, L., Dougherty, L., "MR imaging of motion with spatial modulation of magnetization," *Radiology* 171, 841-845, 1989), phase contrast (PC) velocity encoding (see, e.g., van Dijk, P., "Direct cardiac MNR imaging of heart wall and blood flow velocity," *Journal of computer assisted tomography* 8(3), 429-436, 1984; Bryant, D., Payne, J., Firmin, D., Longmore, D., "Measurement of flow with NMR imaging using gradient pulse and phase difference technique," *Journal of computer assisted tomography* 8(4), 588-593, 1984), and more recently, displacement encoding with stimulated echoes (DENSE) (Aletras, A., Ding, S., Balaban, R., Wen, H., "DENSE: displacement encoding with stimulated echoes in cardiac functional MRI," *Journal of Magnetic Resonance* 137, 247-252, 1989).

These techniques are potentially useful for the diagnosis, prognosis and management of heart disease, but their clinical use is currently limited by lack of automation.

Defining epicardial and endocardial contours is an integral step in quantifying regional cardiac wall motion. For cine DENSE these are typically manually delineated for all cardiac phases, which is a laborious process and is currently the most time-consuming component of the cine-DENSE image analysis. Even for myocardial tagging, for which the processing is less-automated than cine DENSE, Montillo, A., Metaxas, D., Axel, L., "Automated segmentation of the left and right ventricles in 4-D cardiac SPAMM images," *International Society and Conference Series on Medical Image Computing and Computer-Assisted Intervention* (MICCAI), LNCS 2488, 620-633, 2002, estimates that 80 percent of the time required to analyze tagged datasets involves outlining the contours of the ventricles. Automated myocardial contour detection techniques based on image intensity are ill-suited to cine DENSE because: 1. boundaries between the myocardium and adjacent tissue (e.g. the liver) are often indiscernible; 2. a T1-related decay in signal-to-noise ratio (SNR) with time is often present; and 3. high signal is present in the encoded blood of the first few frames, before it is washed out of the image plane.

A number of advances have been made towards automating image segmentation for myocardial tagging and velocity encoding, but no segmentation algorithm currently exists for cine DENSE. Some early attempts to automate contour detection for tagged images made use of manually-guided active geometry Kumar, S., Goldgof, D., Automatic tracking of SPAMM grid and the estimation of deformation parameters from cardiac MR images. IEEE Transactions on Medical Imaging 13 (1), 122-132, 1994.

Young, A. A., Kraitchman, D. L., Dougherty, L., Axel, L., "Tracking and finite element analysis of stripe deformation in magnetic resonance tagging," *IEEE Transactions on Medical Imaging* 14(3), 413-421, 1995; Guttmann, M. A., Prince, J. L., McVeigh, E. R., "Tag and contour detection in tagged MR images of the left ventricle," *IEEE Transactions on Medical Imaging* 13(1), 74-88, 1994), presented a completely automated approach based on a hierarchy of image processing steps, including morphological closing to eliminate tag lines, candidate point selection based on large image gradients, and a dynamic programming algorithm that minimizes several cost functions. Their method performed well for detection of the endocardial boundary in both short- and long-axis images, but limited manual correction was sometimes required for the epicardium. Montillo et al. (2002) developed a completely automated method that uses volumetric data of stacked short-axis tagged images. For endocardial segmentation they used 3D greyscale morphological opening to identify the blood pools, and then applied a binary 3D cylinder shaped structuring element. The epicardial contour was found by filling the tags using a linear structuring element, and expanding an active contour model from the endocardium. The average distance error of the segmented epicardial contour compared to manually-drawn contours was reported to be less than 1.2 pixels. Montillo, A., Metaxas, D., Axel, L., "Automated model-based segmentation of the left and right ventricles in tagged cardiac MRI," *International Society and Conference Series on Medical Image Computing and Computer-Assisted Intervention* (MICCAI), LNCS Vol 2878, 507-515, 2003, furthered this work and developed an automated, deformable model-based method to segment the left and right ventricles in 4D tagged MR. They compared the results with 2D manually drawn contours and for the epicardium found that 50 percent of segmented points were within 2.1 pixels (a pixel is 1×1 mm$^2$), and 90 percent were within 6.3 pixels of manually identified regions.

Although PC velocity encoded magnitude images are not interrupted by tag lines, they are "white blood" sequences and thus suffer from a lack of contrast between blood and myocardium. A useful feature in PC velocity encoding is that both magnitude and phase images can be used to assist the segmentation process, whereby edge and velocity information is obtained from the magnitude and phase images, respectively. It is worth remembering that magnitude and phase images are perfectly co-registered since they are directly derived from the complex MRI data. The use of velocity-constrained active contour models has been developed for computer vision (see, e.g., Peterfreund, N., "The velocity snake: deformable contour for tracking in spatio-velocity space, "*Computer Vision and Image Understanding* 73(3), 346-356, 1999) and medical image analysis (see, e.g., Li, M, Kambhamettu, C, "Motion-based post processing of deformable contours," In: Proc. Indian Conference on Computer Vision, Graphics and Image Processing (ICVGIP), 2002). A few more recent studies have used PC velocity information of the myocardium to improve the accuracy of sequential frame segmentation of the myocardial boundaries.

Wong, A. L. N., Liu, H., Shi, P., "Segmentation of the Myocardium Using Velocity Field Constrained Front Propagation," *Proceedings of the 6$^{th}$ IEEE Workshop on Applications of Computer Vision*, p 84, 2002, presents a myocardial segmentation technique where velocity fields from PC velocity encoding are combined with a two-stage front propagation technique. The front propagation is done using fast marching followed by a level set method. Velocity information is then incorporated based on the front distribution at the preceding cardiac phase. In addition, they used a local measure of phase coherence to eliminate noisy velocity measurements. Although only initial qualitative results are presented, it is clear that the velocity constrained contours for both the epi- and endocardium are superior to those obtained using intensity information alone.

In a related study, Cho, J., Benkeser, P. J., "Cardiac segmentation by a velocity-aided active contour model," *Computerized Medical Imaging and Graphics* 30, 31-41, 2006, proposed a velocity-aided cardiac segmentation method for the endocardium based on a modified active contour model. They introduced a new image force called the tensor-based orientation gradient force. Boundary matching descriptors were used to provide a quantitative measure of shape similarity between estimated and manually-drawn boundaries. A significant improvement was seen when the orientation gradient force was taken into account.

It would be advantageous to provide a segmentation method that uses tissue tracking based on the encoded motion to project a single manually-defined set of contours through time. Such a method may rely exclusively on the cine DENSE phase images to thereby benefit from a unique noise-immunity.

SUMMARY OF THE INVENTION

A method for modeling tissue motion is disclosed, comprising: providing a plurality of digitized images of a portion of patient tissue, said plurality of digitized images comprising successive frames representing motion of said tissue; performing spatiotemporal phase unwrapping of the frames; calculating displacement vectors for all pixels of all frames; defining a portion of the tissue at any one frame; using a modulus deformation mask to remove all displacement vectors with deformation above a predetermined amount; for the displacement vectors at each frame having deformation below said predetermined amount, finding a predetermined number of closest vector tails of said displacement vectors to each identified tissue position at time=0; calculating how much each displacement vector differs from a mean magnitude and angle of the predetermined number of closest vector tails; ignoring displacement vectors with an angle deviation greater than a predetermined number of radians and a predetermined magnitude deviation from the mean magnitude; selecting the three closest vector tails of the remaining vector tails and using the three closest vector tails for a 2D interpolation; representing trajectory position at each frame by a 2D Gaussian function with an area of unity and a standard deviation, and then obtaining a binary mask for each frame by thresholding the associated frame image at 0.5; obtaining isocontours based on the binary images resulting from the binary mask; designating the longest isocontour as an outer tissue portion and the second longest isocontour as an inner tissue portion; and smoothing the contours by fitting periodic functions as a function of arc length.

Also disclosed is a machine readable storage device tangibly embodying a series of instructions executable by the machine to perform a series of steps. The steps may comprise: providing a plurality of digitized images of a portion of patient tissue, said plurality of digitized images comprising successive frames representing motion of said tissue; performing spatiotemporal phase unwrapping of the frames; calculating displacement vectors for all pixels of all frames; defining a portion of the tissue at any one frame; using a modulus deformation mask to remove all displacement vectors with deformation above a predetermined amount; for the displacement vectors at each frame having deformation below said predetermined amount, finding a predetermined number of closest vector tails of said displacement vectors to each identified tissue position at time=0; calculating how much each displacement vector differs from a mean magnitude and angle of the predetermined number of closest vector tails; ignoring displacement vectors with an angle deviation greater than a predetermined number of radians and a predetermined magnitude deviation from the mean magnitude; selecting the three closest vector tails of the remaining vector tails and using the three closest vector tails for a 2D interpolation; representing trajectory position at each frame by a 2D Gaussian function with an area of unity and a standard deviation, and then obtaining a binary mask for each frame by thresholding the associated frame image at 0.5; obtaining isocontours based on the binary images resulting from the binary mask; designating the longest isocontour as an outer portion of said tissue and the second longest isocontour as an inner portion of said tissue; and smoothing the contours by fitting periodic functions as a function of arc length.

A system for modeling tissue motion is also disclosed, comprising: means for providing a plurality of digitized images of a portion of patient tissue. The plurality of digitized images may comprise successive frames representing motion of said tissue. The system may further comprise means for performing spatiotemporal phase unwrapping of the frames, means for calculating displacement vectors for all pixels of all frames, means for defining a portion of the tissue at any one frame, and means for using a modulus deformation mask to remove all displacement vectors with deformation above a predetermined amount. For the displacement vectors at each frame having deformation below said predetermined amount, means may be provided for finding a predetermined number of closest vector tails of said displacement vectors to each identified myocardial position at time=0. The system may further comprise means for calculating how much each displacement vector differs from a mean magnitude and angle of the predetermined number of closest vector tails, means for ignoring displacement vectors with an angle deviation greater than a predetermined number of radians and a predetermined magnitude deviation from the mean magnitude, means for selecting the three closest vector tails of the remaining vector tails and using the three closest vector tails for a 2D interpolation, means for representing trajectory position at each frame by a 2D Gaussian function with an area of unity and a standard deviation, and then obtaining a binary mask for each frame by thresholding the associated frame image at 0.5, means for obtaining isocontours based on the binary images resulting from the binary mask, means for designating the longest isocontour as an outer portion of the tissue and the second longest isocontour as an inner portion of the tissue. and means for smoothing the contours by fitting periodic functions as a function of arc length.

BRIEF DESCRIPTION OF THE DRAWINGS

The accompanying drawings illustrate exemplary embodiments of the invention so far devised for the practical application of the principles thereof, and in which:

FIG. 3 shows an end-systolic DENSE displacement field; FIG. 4 shows a magnified portion of the displacement field of FIG. 3; and FIG. 5 shows a frame-to-frame trajectory obtained by subtracting the interpolated vectors of successive frames;

FIGS. 12A and 12B show longitudinal motion depicted on tagged long-axis images of a normal volunteer at FIG. 12A: early-systole, and FIG. 12B end-systole, in which RV is the right ventricle, and LV is the left ventricle;

FIG. 13 is a short-axis view of the heart showing the four radial spokes along which differences between manual and automated contours are measured;

FIGS. 15A and 15B show the effect of through-plane motion on motion-guided segmentation in conventional cine DENSE data of a mid-ventricular short-axis slice of a normal volunteer. (a) Motion-guided contour at late-diastole, where the manually defined contour was at end-systole, and (b) Motion-guided contour at end-systole, where the manually defined contour was at late-diastole; and FIGS. 16A-F show motion-guided segmentation applied to long-axis conventional cine DENSE data.

DETAILED DESCRIPTION

DENSE uses the phase of the stimulated echo to monitor myocardial motion and deformation at a pixel resolution. The magnetization is initially position encoded using a 1-1 spatial modulation of magnetization (SPAMM) tagging sequence, which is typically applied at end-diastole. Displacement is then accrued as a phase shift during the time between the SPAMM sequence and readout, resulting in images with phase proportional to displacement. Cine DENSE (see, e.g., Kim, D., Gilson, W., Kramer, C., Epstein, F., "Myocardial tissue tracking with two-dimensional cine displacement-encoded MR imaging: Development and initial evaluation," *Radiology* 230, 862-871, 2004) provides a time series of such displacement measurements.

Cine DENSE allows for displacement encoding in any direction, but 2 or 3 orthogonally encoded directions are typically applied. Since only the final phase accrual of the spins is measured, MRI phase is inherently confined to the range $-\pi < \phi < \pi$. The true phase is thus wrapped to lie within this range, and spatiotemporal phase unwrapping is required for absolute displacement measurements (see, e.g., Spottiswoode, B. S., Zhong, X., Hess, A. T., Kramer, C. M., Meintjes, E. M., Mayosi, B. M., Epstein, F. H., "Tracking Myocardial Motion from Cine DENSE Images using Spatiotemporal Phase Unwrapping and Temporal Fitting," *IEEE Transactions on Medical Imaging* 26(1), 15-30, 2007). Spatiotemporal phase unwrapping is typically done with pre-defined myocardial contours to minimize errors and reduce processing times.

Figures 1, 2:
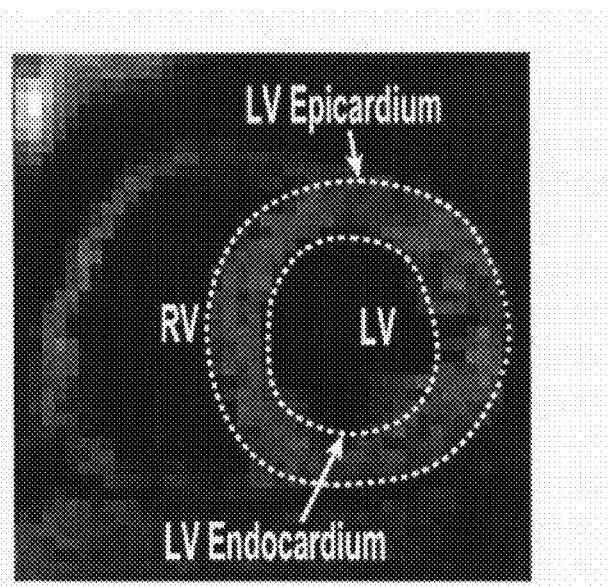
FIG. 1 is a Cine DENSE magnitude mid-ventricular short-axis view of the heart at end-systole, in which LV identifies the left ventricle; and RV identifies the right ventricle.
FIG. 2 is a two dimensional in-plane displacement field derived from corresponding vertical and horizontal unwrapped cine DENSE phase-reconstructed images.

FIG. 1 shows a cine DENSE magnitude-reconstructed image of a mid-ventricular short-axis view of the heart. The left and right ventricular cavities are shown, as are the epicardial and endocardial borders of the left ventricle (LV). It is these contours at all cardiac phases that are typically sought after for LV analysis in short-axis images. FIG. 2 shows the corresponding 2D displacement field derived from orthogonal in-plane unwrapped cine DENSE phase images. DENSE displacement vectors are visualized as having heads positioned at the centre of all myocardial pixels, and tails originating from the reference position of these pixels at the time of displacement encoding, $t_0$.

As the heart deforms, a material point moves from its reference point $p=(p_1, p_2)$ at time $t_0$ to a new spatial position $x$ at time frame $t_n$. Here $t_n = t_1, \ldots, t_F$, where F is the number of frames in the series, and $t_0$ is the time of displacement encoding. The reference map $p(x, t_n)$ characterizes this motion, where $p(x, t_0) = p$. If displacement is encoded in two orthogonal directions $\hat{i}$ and $\hat{j}$, then the 2D DENSE displacement field can be calculated, and is given by $u(x, t_n) = p(x, t_n) - p$. Note that the time between $t_0$ and $t_1$ is 3 milliseconds (ms), and corresponds to the time between displacement encoding and the first cardiac phase imaged. This is much shorter than the uniform time intervals $t_2 - t_1, \ldots, t_F - t_{F-1}$.

Figure 3:
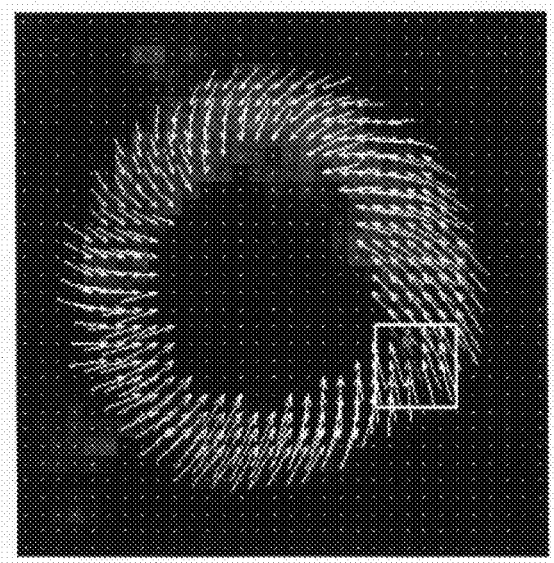
FIGS. 3-5 show Cine DENSE 2D tissue tracking.
Figure 4:
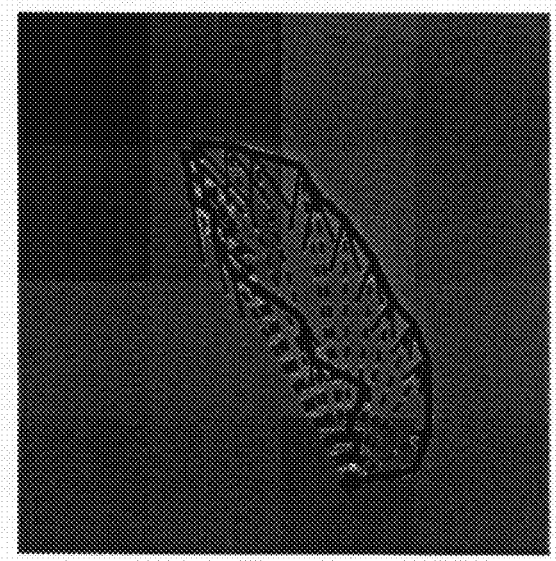
Figure 5:
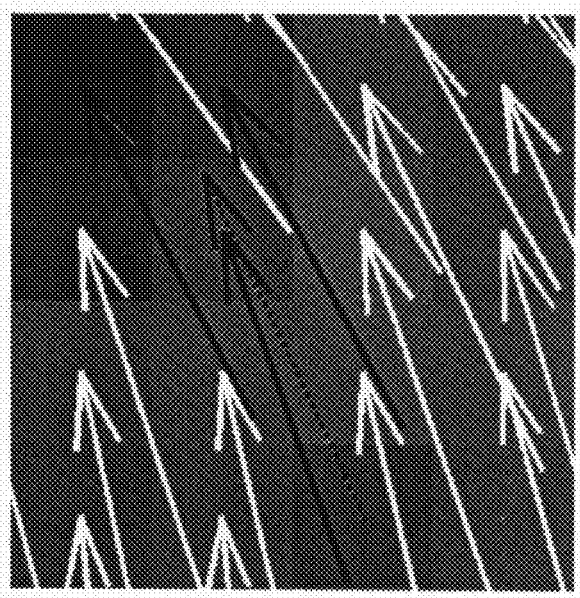

Two-dimensional frame-to-frame motion trajectories for discrete elements of the myocardium can be obtained using 2D distance weighted linear interpolation of these displacement vectors (see, e.g., Spottiswoode et al. 2007). This tracking method is demonstrated for a single frame-to-frame trajectory in FIGS. 3-5. FIG. 3 shows a DENSE displacement field of the LV at end-systole, and FIG. 4 is an isolated portion of this image. All solid vectors have heads at pixel centers. The tail of the black vector depicts an arbitrarily chosen starting point at $t_1$. Note that the displacement that occurred between $t_0$ and $t_1$ is ignored for the convenience of using fixed time intervals and a linear grid of starting points. For each frame $t_2, \ldots, t_F$, the three vector tails closest to this starting position are identified. These are shown as black vectors in FIG. 4 for the end-systolic frame. Two dimensional distance-weighted linear interpolation yields the position of this starting point at each frame (black vectors in FIG. 4). The three solid black vectors are the vectors at this frame used for the interpolation, and the dotted vector is the interpolated vector. FIG. 5 shows the frame-to-frame trajectory obtained by subtracting the interpolated vectors of successive frames from each other.

Methods

Motion-Guided Segmentation Algorithm

The inventors disclose using the motion encoded within the cine DENSE images to guide the segmentation process. This is achieved by using the myocardial motion trajectories to project any manually defined portion of myocardium at one cardiac phase onto all other cardiac phases. Since the cine DENSE displacement fields all reference time $t_0$, the initial contour(s) can be drawn on any cardiac phase. The displacement vector starting points of every pixel in the manually contoured region thus define the position of the selected portion of myocardium at $t_0$, and tracking these starting points though time identifies the position of this myocardium at all other frames.

Figure 6:
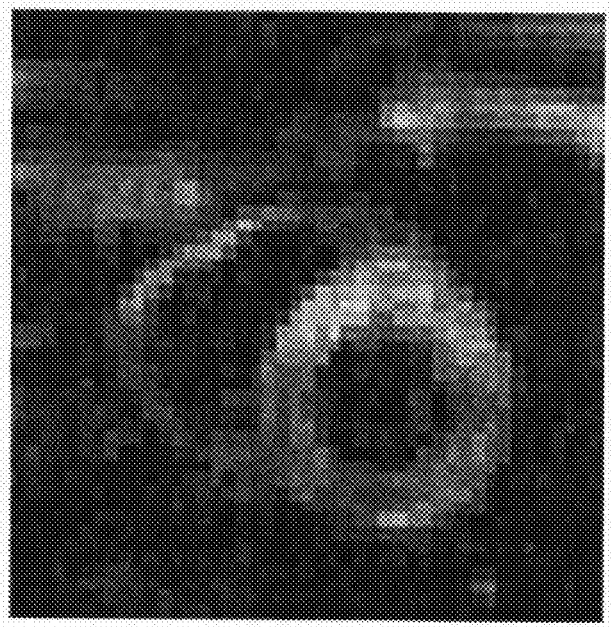
FIG. 6 is a magnitude-reconstructed overview image of the heart in a short-axis view.
Figure 7:
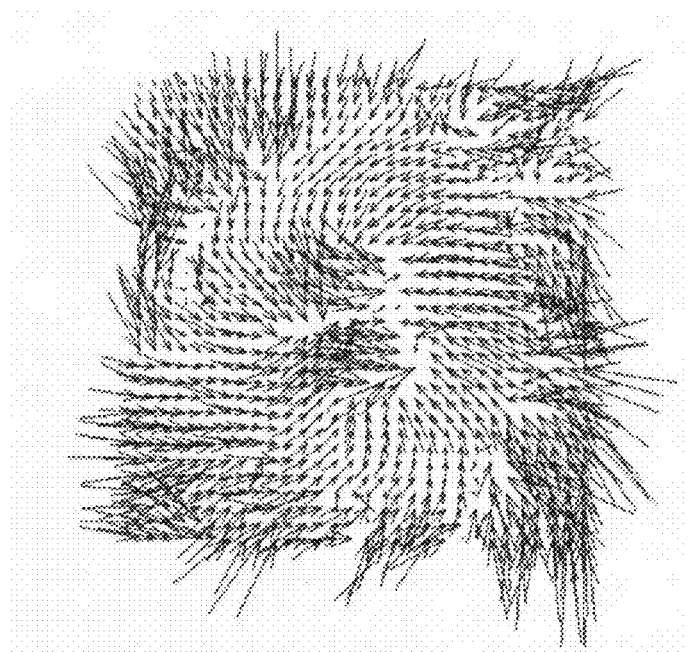
FIG. 7 shows a DENSE displacement field corresponding to the region portrayed in FIG. 6, derived by applying spatiotemporal phase unwrapping without pre-defined contours.

If spatiotemporal phase unwrapping is performed without pre-defined contours, then regions of noisy phase produce randomly scaled and oriented displacement vectors. An example of an un-contoured DENSE displacement field for the region portrayed in FIG. 6 is shown in FIG. 7. The phase data in the blood and pulmonary cavity is comprised of noise, and the appearance of these vectors is random. The smoothly varying motion in the LV is evident contracting towards the center of the image. The aim here is to extract only vectors in the myocardium from such displacement fields given a set of predefined myocardial starting points at $t_0$. Note that only LV segmentation is discussed here.

Obtaining suitable motion trajectories from these noisy displacement fields requires a series of refinements to the motion tracking algorithm described above, where the 3 nearest vector tails are selected for 2D distance-weighted linear interpolation. If a manually-defined set of myocardial points at to are tracked using this algorithm, then frame-to-frame trajectories such as those shown in FIG. 9A result. Many of these trajectories are incorrect because noisy vectors from the lungs and blood pools intrude into the myocardium and are inadvertently being used for the 2D interpolations.

Figure 8:
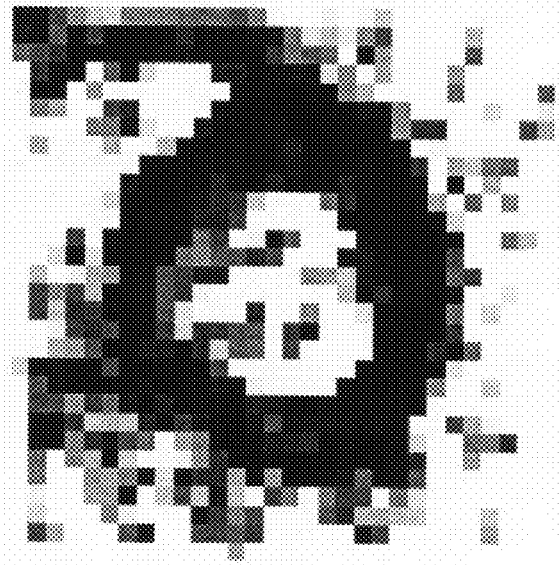
FIG. 8 shows a deformation mask corresponding to the DENSE displacement field of FIG. 7.
Figures 9A, 9B, 9C:
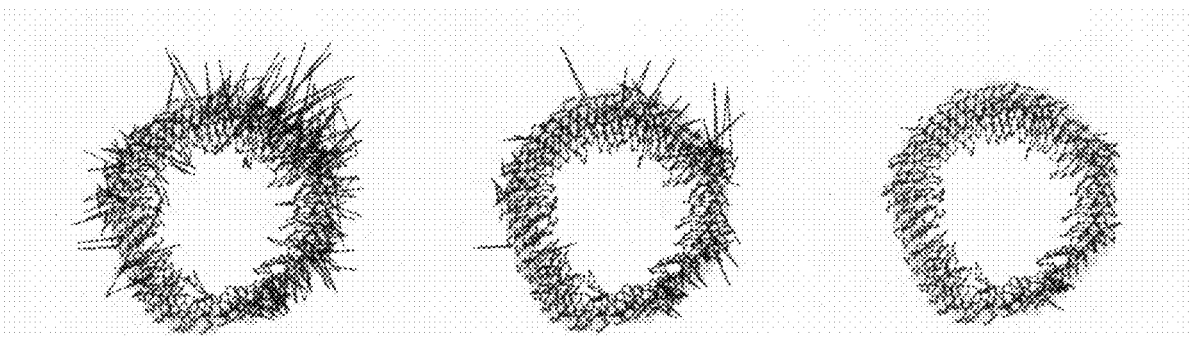
FIG. 9A shows frame-to-frame trajectories obtained by tracking using 3 closest vector tails.
FIG. 9B shows frame-to-frame trajectories after applying a deformation mask.
FIG. 9C shows frame-to-frame trajectories after applying both a deformation mask and a heuristic vector magnitude and angle deviation criteria.

Removing the noisy displacement vectors in the blood and pulmonary cavities can be done in a variety of ways, and is not the focus of this invention. A noise-removal technique based on this cine DENSE tissue tracking method is now presented. The trajectories in FIG. 9A can be improved by applying the following two steps:

1. Remove noisy displacement vectors using a modulus deformation mask, which is obtained for each frame $t_n$ by combining orthogonal spatial derivatives of the displacement fields as follows:

$$M(x, t_n) = \frac{1}{2} \sum_{k=i,j} \left[ \left(\frac{\partial u_k(x, t_n)}{\partial \hat{\imath}}\right)^2 + \left(\frac{\partial u_k(x, t_n)}{\partial \hat{\jmath}}\right)^2 \right]^{1/2} \quad (1)$$

where $u_{\hat{\imath}}$ and $u_{\hat{\jmath}}$ represent the components of the cine DENSE displacement field in the $\hat{\imath}$ and $\hat{\jmath}$ directions, respectively, for spatial position x within the image plane. The deformation mask corresponding to FIG. 7 is shown in FIG. 8. By setting a threshold that excludes all deformation values greater than those found in the human heart, the majority of the noisy displacement vectors are eliminated. A magnitude deformation threshold of 70% was used here. The deformation mask can be related to standard measures of myocardial strain, and this threshold of 70% is well above typical strain values (see, e.g., Moore, C. C., Lugo-Olivieri, C. H., McVeigh, E. R., Zerhouni, E. A., "Three dimensional systolic patterns in the normal human left ventricle: characterization with tagged MR imaging," *Radiology* 214, 453-466, 2000). FIG. 9B shows the resulting trajectories if such a deformation mask is used prior to applying the tracking algorithm. These are less noisy than the trajectories shown in FIG. 9A.

2. For each frame, we apply heuristic rules based on the behavior of displacement vectors in a local region to further eliminate/exclude noisy vectors in the tracking process. The deformation masks remove the majority of the noisy vectors, and it is thus reasonable to eliminate remaining noisy vectors based on their deviation from the mean magnitude and angle of nearby vectors. The 9 vectors with tails nearest to each starting point at to are selected, and vectors with an angle deviation greater than $\pi/6$ radians and a magnitude deviation greater than 0.7 are ignored. The remaining closest 3 vector tails are then used for tracking. The trajectories shown in FIG. 9C portray the improvement offered by these rules. These limiting values of angle and magnitude deviation yield satisfactory results without limiting the expected range of myocardial motion.

Note that the magnitude deviation, which is based on positions of vector tails, is a different measure to the deformation mask, which is computed at each pixel. The trajectories in FIG. 9C give an indication of the position of the selected myocardium at each cardiac phase, and the remainder of the segmentation process involves extracting the epicardial and endocardial contours from this short-axis data. One such method is presented.

Figures 10A, 10B, 10C:
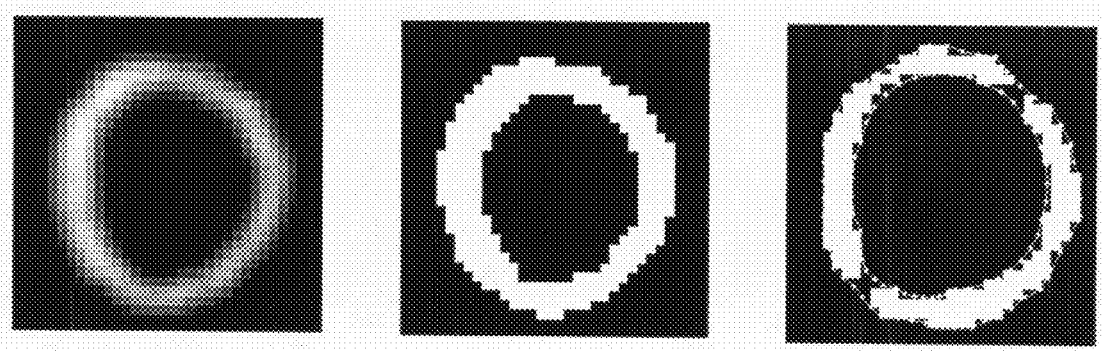
FIG. 10A shows a smooth myocardial image obtained by representing each trajectory position at the current frame by a 2D Gaussian function with an area of unity and a standard deviation of 1.25 pixels.
FIG. 10B shows a binary mask of the myocardium of FIG. 10A, achieved by applying a threshold of 0.5 to the smooth myocardial image.
FIG. 10C shows active contour models applied to bridge gaps appearing when the myocardial wall is thin.

A binary mask of the myocardium at each frame can be obtained by representing each trajectory position at each frame by a 2D Gaussian function with an area of unity, and then taking a threshold at a value of 0.5. A Gaussian standard deviation of 1.25 pixels was found to be suitable for this application, and a typical result is portrayed in FIGS. 10A and 10B. The contours can then easily be extracted as isolines, which run along the pixilated edges of the binary masks. For short-axis views the longest contour is defined as the epicardium and the second longest is defined as the endocardium. In the event that the myocardial thickness spans only a pixel or two, it is possible for discontinuities to exist in the binary mask, as shown in FIG. 10C. Although no such discontinuities arose for the data used in this study, active contour models (see, e.g., Kass, M., Witkin, A., Terzopoulos, D., "Snakes: Active contour models," *International Journal of Computer Vision* 1, 321-331, 1988) could be used to bridge these gaps, as portrayed in FIG. 10C.

Finally, the resulting contours were smoothed by fitting periodic curves to each of the spatial directions $\hat{\imath}$ and $\hat{\jmath}$ as a function of arc length s. Fourier basis functions were used as follows:

$$f_{i,j}(s) = \frac{1}{2}a_0 + \sum_{m=1}^{N} a_m \cos(m\omega s) + \sum_{m=1}^{N} b_m \sin(m\omega s) \quad (2)$$

where $a_m$ and $b_m$ are the Fourier series coefficients, $\omega = 2\pi/S$ is the spatial angular frequency, S is the total arc length of the contour, and N is the order of the fit. The arc length s is derived by summing the discrete lengths of the straight line segments along the isoline. Fitting was done using least squares and $4^{th}$ order functions, requiring 18 coefficients for both directions, were found to be adequate to describe the short-axis contour shapes encountered in this study. The variation in contour shape from frame-to-frame is often small, so the processing time can be reduced by using the fitted Fourier coefficients for a particular frame as starting coefficients for an unfitted adjacent frame.

Figure 11:
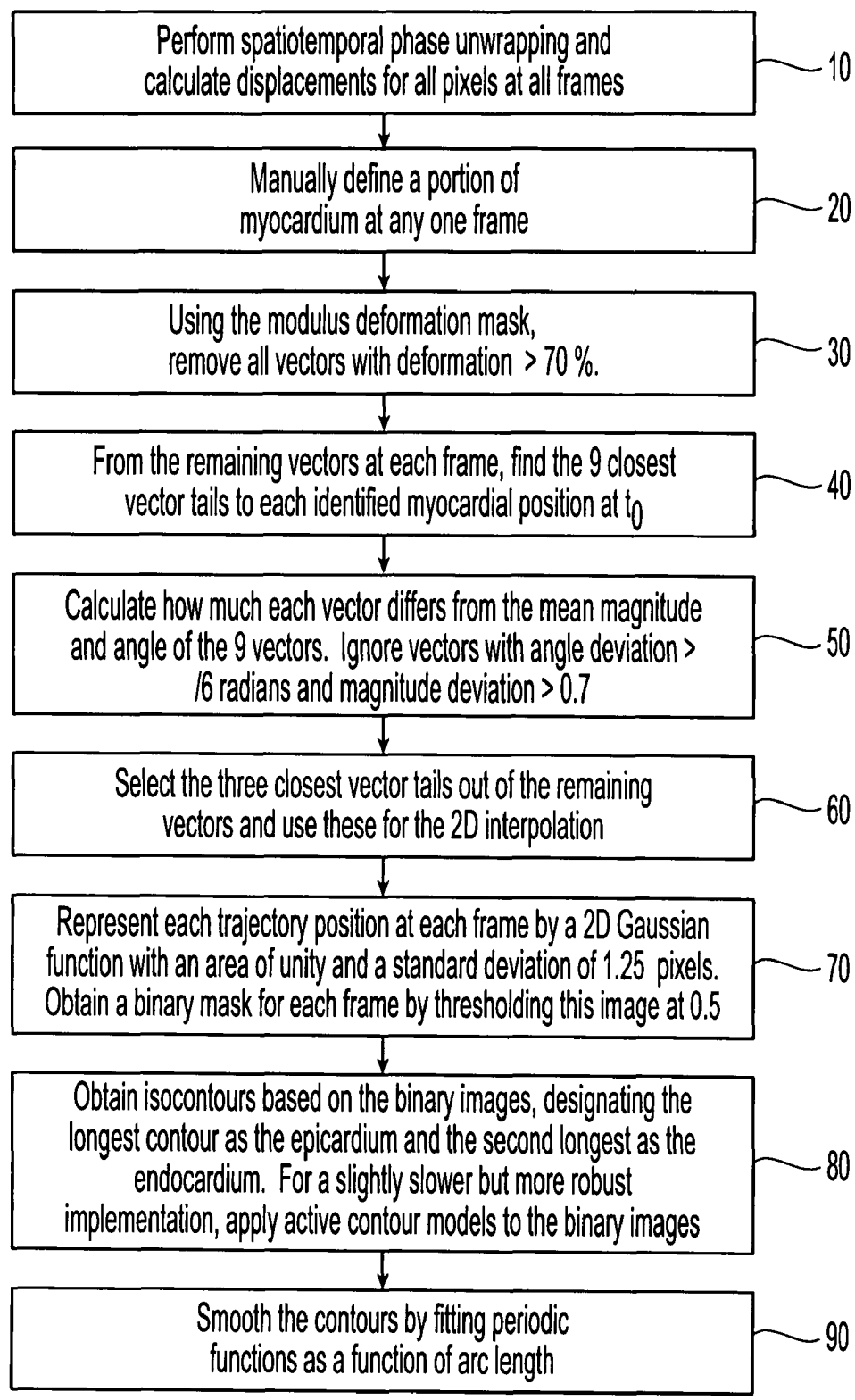
FIG. 11 is a flow chart illustrating the inventive algorithm.

With reference to FIG. 11, the full motion-guided segmentation algorithm is now summarized:

1. At 10, perform spatiotemporal phase unwrapping and calculate displacements for all pixels at all frames.

2. At 20, manually define a portion of myocardium at any one frame.

3. At 30, using the modulus deformation mask, remove all vectors with deformation>70%.

4. At 40, from the remaining vectors at each frame, find the 9 closest vector tails to each identified myocardial position at to.

5. At 50, calculate how much each vector differs from the mean magnitude and angle of the 9 vectors. Ignore vectors with angle deviation>$\pi/6$ radians and magnitude deviation>0.7.

6. At 60, select the three closest vector tails out of the remaining vectors and use these for the 2D interpolation.

7. At 70, represent each trajectory position at each frame by a 2D Gaussian function with an area of unity and a standard deviation of 1.25 pixels. Obtain a binary mask for each frame by thresholding this image at 0.5.

8. At 80, obtain isocontours based on the binary images, designating the longest contour as the epicardium and the second longest as the endocardium. For a slightly slower but more robust implementation, apply active contour models to the binary images.

9. At 90, smooth the contours by fitting periodic functions as a function of arc length.

Experiment and Validation

The cine DENSE scans were performed on 1.5 T Siemens Sonata and Avanto scanners (Siemens Medical Systems, Erlangen, Germany). Six normal volunteers were scanned, and all subjects provided informed consent and were studied in accordance with research protocols approved by the Human Investigations Committee at the University of Virginia. Both conventional cine DENSE (Kim et al. 2004) and slice-followed cine DENSE (Spottiswoode, B. S., Zhong, X, Lorenz, C. H., Meintjes, E. M., Mayosi, B. M., Epstein, F. H., "Tracking 3-D Myocardial Motion using Slice-followed Cine DENSE," *Journal of Cardiovascular Magnetic Resonance*, vol. 8, no. 1, pp. 80-81, January 2006) data were acquired for each volunteer, with displacement encoding applied in two orthogonal in-plane directions.

Slice following (see, e.g., Fischer, S. E., McKinnon, G. C., Scheidegger, M. C., Prins, W., Meier, D., Boesiger, P., "True myocardial motion tracking," *Magnetic Resonance in Medicine* 31, 401-413, 1994; Stuber, M., Spiegel, M. A., Fischer, S. E., Scheidegger, M. B., Danias, P. G., Pedersen, E. M., Boesiger, P., "Single breath-hold slice-followed CSPAMM myocardial tagging," *Magnetic Resonance Materials in Physics, Biology and Medicine* 9, 85-91, 1999) uses spatially selective excitation and image subtraction to account for motion through the image plane. The slice-followed cine DENSE data was acquired to investigate the effects of through-plane motion on the motion-guided segmentation. FIGS. 12A and 12B show a four-chamber view of the heart, at early- and end-systole, with tags portraying longitudinal motion. A fixed mid-ventricular short-axis plane is shown as a dashed line in both images, as is the motion of discrete points relative to this plane (i.e., the position of discrete points in the LV free wall and RV free wall are shown relative to the imaging plate). The larger-diameter base can be seen to move into the short-axis plane during systole. Base-to-apex motion thus introduces errors in the short-axis motion guided contours for conventional cine DENSE. Both epicardial and endocardial motion-guided contours will shrink excessively during systole and expand excessively during diastole when compared to the respective borders on the DENSE magnitude images. To minimize this error, manual contours should be drawn at mid-systole.

A four-channel body phased array RF coil was used, and the subjects were imaged in a short-axis, mid-ventricular view. Imaging parameters included FOV=360×236 mm; echo train length (ETL)=9; effective TE=11 ms; TR=22 ms; matrix size=128×94 pixels; voxel size=2.81×2.81×8 mm; and displacement encoding frequency $k_e$=0.1 cycles/mm. The true temporal resolution was 40 ms and the number of cardiac phases varied between 15 and 22. Scans were acquired in breath holds of 16 heart beats per encoding direction. Images were reconstructed on-line and analyzed off-line using custom software written in MATLAB (The Mathworks Inc, Natick, Mass.).

For each dataset, starting points at to were defined by manually contouring epicardial and endocardial borders for a single cardiac phase in mid-systole. To quantify the segmentation accuracy and the effect of through-plane motion, manual distance measurements were made between the motion-guided contour and the epicardium on the LV free wall. As shown in FIG. 13, these measurements were made radially in four places, along lines stemming from the centroid of the epicardial contour, and separated by an angle of $\pi/6$ radians. A mean error in pixels was then calculated for each cardiac phase. This portion of the epicardium was chosen because the border is clearly visible throughout the cardiac cycle, and because the LV through-plane motion is greatest in the free wall. The endocardial border was not investigated here because of the presence of papillary muscles and the high signal intensity in the blood during the first few frames.

FIG. 13 illustrates a short-axis view of the heart showing the four radial spokes along which differences between manual and automated contours are measured. Dotted contour—automated; solid contour—manual. The arrows depict the radial errors, which are averaged for each frame. Note that the error in the automated contour in this example has been exaggerated for the purpose of demonstration.

For four of the slice-followed datasets, the automatic contours were compared to manually-drawn contours from two independent observers using the mean of false positive and false negative area measures. For each observer, the manual contours at mid-systole were used to initiate the motion-guided segmentation process. The false negative area measure identifies the percentage of myocardium missed by the algorithm, and the false positive area measure identifies the percentage of tissue falsely identified by the algorithm. If $C_M$ is a set defining the region enclosed by the manually-drawn contour and $C_A$ is a set defining the region enclosed by the algorithm's contour, then the false positive error is given by $N(C_A-C_M)/N(C_M)$, and the false negative error is given by $N(C_M-C_A)/N(C_M)$. Here N represents the number of points in the set and "−" is the subtraction of sets. Inter-observer variability was calculated using the same method.

Results

Figure 14A:
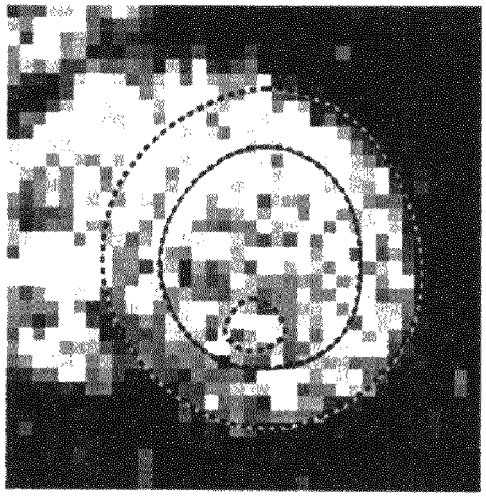
FIGS. 14A-14D show the magnitude-reconstructed slice followed cine DENSE images of a short-axis view at end-diastole, early-systole, end-systole, and mid-diastole, respectively.
Figure 14B:
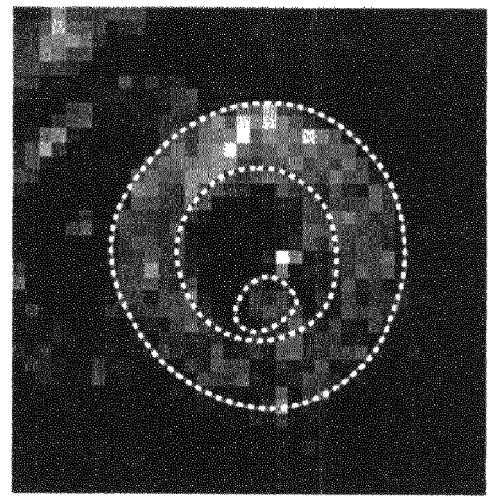
Figure 14C:
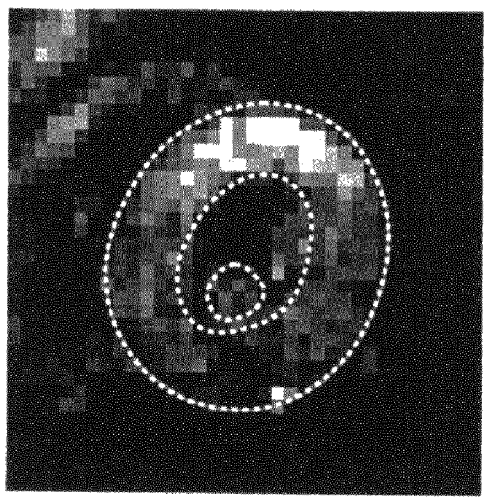
Figure 14D:
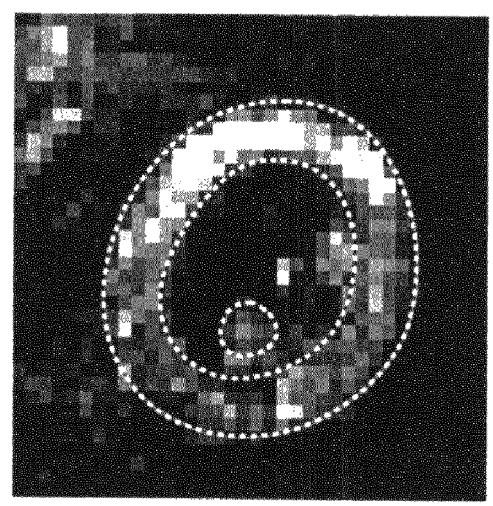

FIG. 14B shows a typical early-systolic slice-followed cine DENSE magnitude image with a manually-drawn set of contours. FIGS. 14A, 14C and 14D depict the corresponding motion-guided contours for a few cardiac phases. Note in FIG. 14A that contours are reliably projected onto the first cardiac phase, where many of the borders are indistinguishable to the human observer. To demonstrate the flexibility of this method, a papillary muscle has also been contoured using the same algorithm (dotted lines). Note that no evidence of errors due to through-plane motion is present in FIGS. 14A-D. FIGS. 15A, B show the effect of through-plane motion when the segmentation algorithm is applied to conventional cine DENSE data. FIGS. 15A and 15B depict the swelling and shrinking of the motion-guided contours that accompanies diastole and systole, respectively. The effect was exaggerated here by drawing the manual contour at end-systole for FIG. 15A, and at late-diastole for FIG. 15B. As expected, the error is greater for the LV free wall than for the septum.

Referring again to FIGS. 14A-14D, the magnitude-reconstructed slice followed cine DENSE images of a short-axis view at end-diastole (FIG. 14A), early-systole (FIG. 14B); end-systole (FIG. 14C), and mid-diastole (FIG. 14D), are shown. The manually-drawn contour is shown in FIG. 14B and the corresponding motion-guided contours are shown in FIGS. 14A, C and D. The dotted line depicts a papillary muscle that has been tracked and contoured using the same algorithm.

FIGS. 15A and 15B show the effect of through-plane motion on motion-guided segmentation in conventional cine DENSE data of a mid-ventricular short-axis slice of a normal volunteer. Motion-guided contour at late-diastole, where the manually defined contour was at end-systole (FIG. 15A), and motion-guided contour at end-systole, where the manually defined contour was at late-diastole (FIG. 15B).

Based on the mean of false positive and false negative area measures with manually-defined contours for four of the datasets, the segmentation error between the two observers is 18.12±5.98%, between observer A and the algorithm is 12.70±4.77%, and between observer B and the algorithm is 11.80±4.12%. This demonstrates that the accuracy of the algorithm relative to manually-drawn contours can be superior to inter-observer variability. The mean and standard deviation of the radial segmentation error for the 6 slice-followed and 6 conventional cine DENSE datasets are 0.13±0.12 and 0.21±0.15 pixels, respectively. Note that these error values are specific to short-axis mid-ventricular cine DENSE data, and that although the segmentation error for conventional cine DENSE is greater than for slice-followed cine DENSE, motion-guided segmentation using conventional cine DENSE typically yields acceptable results. Incorrect phase unwrapping caused the algorithm to fail in 3 out of the total 414 frames (0.72%). Based on visual interpretation, a radial segmentation error greater than half a pixel was deemed unacceptable. Using this threshold, the segmentation reliability for slice-followed and conventional cine DENSE of a short-axis mid-ventricular view is 98.2% and 94.8%, respectively. The mean segmentation processing time per frame was 2.39 seconds on a 2.8 GHz Intel Celeron with 256 MB of RAM.

Figure 16D:
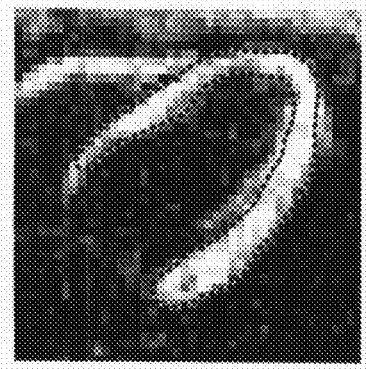

To further demonstrate the flexibility of the method, the algorithm was applied to a set of long-axis conventional cine DENSE images. FIGS. 16A-F shows the results of this process, where FIG. 16C is the manually drawn contour, and the remaining images portray the mapping of this contour onto preceding and successive frames. No adverse effects due to through-plane motion are evident in this example. Due to the shape of the LV in the long-axis view, no periodic Fourier functions were used to smooth the contours. The active contour models and periodic Fourier fits presented here are all geared towards short-axis contours, where the LV is shaped like a torus. Fitting using periodic splines is a suitable alternative for long-axis images or arbitrary regions of myocardium.

Figure 16E:
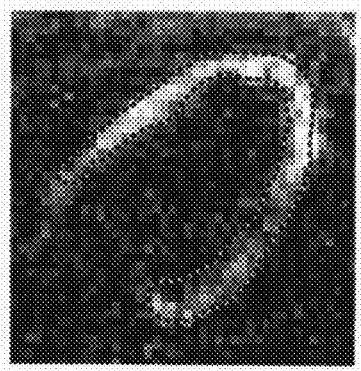
Figure 16F:
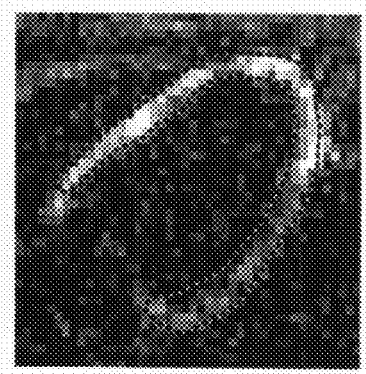

Specifically, FIG. 16A shows end-diastole, FIG. 16B shows early-systole, FIG. 16C shows mid-systole, FIG. 16D shows end-systole, FIG. 16E shows mid-diastole, and FIG. 16F shows late-diastole. The manual contour was drawn at mid-systole, and all contours are portrayed on magnitude-reconstructed cine DENSE images.

Discussion

There are a number of unique advantages to the motion-guided segmentation method disclosed herein: 1. the parameters used to discern between useful and noisy vectors are all based on practical physiological limits; 2. the method ensures that only "high quality" displacement data is used for analysis; 3. contours are calculated for the first few cardiac phases, where it is difficult to visually distinguish blood from myocardium; 4. whereas many segmentation methods are specific to a particular view of the heart, this motion-guided segmentation with slice-followed cine DENSE is independent of the imaging plane; 5. the method is independent of the shape of the tissue delineated, and any arbitrary portions of the myocardium can be tracked through time; and 6. the technique relies exclusively on the cine DENSE phase images and thus benefits from a unique noise-immunity.

Given that the segmentation accuracy is comparable to inter-observer variability, it can be argued that the algorithm will sometimes produce more accurate contours than a trained user. In particular, whereas it may be difficult for a user to consistently identify the same portion of myocardium for each cardiac phase, the segmentation algorithm inherently only includes related myocardial displacement vectors that contribute to the tissue tracking.

Although this segmentation algorithm is based entirely on the cine DENSE phase images, there would be benefit in incorporating edge information from the magnitude images. More specifically, there is scope for completely automating the cine DENSE segmentation by using edge information to define the initial contours or region of interest. For such an application, and even for manually drawn initial contours, pixels with low SNR should be removed from this initial region of myocardium before tracking. This would in turn limit the number of incorrectly labeled points at $t_0$, which if tracked would cause errors on every frame.

Since it is ultimately the phase and not the magnitude of the cine DENSE images that is of interest, it could be useful to draw the initial contour(s) on a phase quality map. A suitable measure of phase quality is the root-mean-square of the variances, within a local region, of the spatial partial derivatives of the locally unwrapped phase (Ghiglia, D. C., Pritt, M. D., 1998, "Two-dimensional phase unwrapping: theory, algorithms and software," Wiley-Interscience, ISBN: 0471249351). A potentially useful method for removing noisy data from cine DENSE images is presented by Sinele, K., Bennett, E., Wen, H., "Automatic masking and phase unwrapping of DENSE myocardial tissue tracking images in human," *Journal of Cardiovascular Magnetic Resonance* 8(1), 146-147, 2006. They initially unwrap phase in four-pixel neighbourhoods to identify phase discontinuities, or residues. If a phase residue is found, then the pixel with the lowest magnitude out of the four is removed. Applying this algorithm prior to phase unwrapping should improve the robustness of the method and reduce the noisy displacement data that may interfere with tissue tracking.

The concept of motion-guided segmentation using tissue tracking also has potential in other areas, particularly speckle tracking. It could, for example, be used in ultrasound speckle tracking, where the correlated speckle pattern is tracked from frame-to-frame through the cardiac cycle using block matching (Li, Y., Garson, C. D., Epstein, F. H., French, B. A., Hossack, J. A., "High resolution 2-D quantification of myocardial motion abnormalities in mice using high resolution ultrasound with MRI validation," *Proceedings of 3$^{rd}$ International Symposium on Biomedical Engineering (ISBI)*, 2006).

Harmonic phase (HARP) analysis is a Fourier filtering technique for automatically processing tagged MRI images (see, e.g., Osman, N. F., McVeigh, E. R., Prince, J. L, "Imaging Heart Motion Using Harmonic Phase MRI," *IEEE Transactions on Medical Imaging* 19(3), 186-202, 2000). HARP is analogous to DENSE in many ways (see, e.g., Kuijer, J., Hofman, M. B., Zwanenburg, J. J., Marcus, J. T., Rossum, A. C., Heethaar, R. M., "DENSE and HARP: two views on the same technique of phase-based strain imaging," *Proceedings of the 14th ISMRM*, Seattle, USA, 2006), and the existence of several HARP tissue tracking techniques (see, e.g., Osman, N. F., Kerwin, W. S., McVeigh, E. R., Prince, J. L., "Cardiac motion tracking using CINE harmonic phase (HARP) magnetic resonance imaging," *Magnetic Resonance in Medicine* 42, 1048-1060, 1999; Pan, L., Lima, J. A. C., Osman, N. F., "Fast tracking of cardiac motion using 3DHARP," *Proceedings of Information Processing and Medical Imaging (IPMI)*, LNCS 2732, 611-622, 2003; Pan, L., Sampath, S., Prince, J. L., Stuber, M., Osman, N. F., "Fast tracking of cardiac material points from SF-CSPAMM images using 3D SF-HARP," *Proceedings of the 13th ISMRM*, Miami, USA, 2005; Abd-Elmoniem, K. Z., Osman, N. F., Prince, J. L., Stuber, M., "HARP: 3-D cardiac motion tracking from short-axis acquisitions," *Proc. 13th ISMRM*, #1649, 2005; Abd-Elmoniem, K. Z., Stuber, M., Prince, J. L., "Fast 3D dense tracking of cardiac material points using ZHARP: in-vivo validation and comparison with 3D SF-HARP," *Proc. 14th ISMRM*, #1653, 2006) encourages the use of motion-guided segmentation for HARP.

Whereas PC velocity encoding measures instantaneous tissue velocity, DENSE measures displacement relative to a fixed encoding time. Several frame-to-frame tissue tracking techniques have been developed for PC velocity encoding (Todd Constable, R., Rath, K. M., Sinusas, A. J., Gore, J. C., "Development and evaluation of tracking algorithms for cardiac wall motion analysis using phase velocity MR imaging," *Magnetic Resonance in Medicine* 32, 33-42, 1994; Pelc, N. J., Drangova, M., Pelc, L. R., "Tracking of cyclic motion with phase-contrast MR velocity data," *Journal of Magnetic Resonance Imaging* 5, 339-345, 1995; Zhu, Y., Drangova, M., Pelc, N. J., "Fourier tracking of myocardial motion using cine-PC data," *Magnetic Resonance in Medicine* 35, 471-480, 1996), but errors inherently accumulate due to velocity integration. The motion-guided segmentation method presented here is reliant on the accuracy of the motion trajectories, and its direct application for PC velocity encoding would be limited.

This segmentation algorithm applies to a single slice of 2D cine DENSE data. If cine DENSE data encoded in three orthogonal directions is acquired in multiple slices (Gilson, W. D., Yang, Z., French, B. A., Epstein, F. H., "Measurement of myocardial mechanics in mice before and after infarction using multislice displacement-encoded MRI with 3D motion encoding," *American Journal of Physiology—Heart and Circulatory Physiology* 288(3), H1491-H1497, 2005; Moghaddam, A. N., Wen, H., Gharib, M., "More comprehensive cardiac DENSE MR imaging by combination of short axis and long axis data," *Proc. 14th ISMRM*, #1652, 2006) or using 3D imaging (Zhong, X., Spottiswoode, B. S., Epstein, F. H., "Myocardial Tissue Tracking Using Volumetric Cine DENSE with Three-dimensional Displacement Encoding: Development and Preliminary Results," To appear in: *Proceedings of the 15th ISMRM*, Berlin, Germany, 2007), then it becomes possible to project the position of a predefined volume of myocardium through time. The volumetric approach would have advantages over single-slice analysis. Firstly, assuming that the imaged volume is large enough to encompass the motion of the region of interest as it traverses the cardiac cycle, there would be no adverse effects due to through-plane motion. Secondly, there would be significantly more myocardial border information present in the magnitude images. This could be used in combination with a deformable surface model that is also guided by the cine DENSE trajectory fields. A comprehensive review of 3D models for functional analysis of cardiac images is given in Frangi, A. F., Niessen, W. J., Viergever, M. A., "Three-dimensional modelling for functional analysis of cardiac images: A review," *IEEE Transactions on Medical Imaging* 20 (1), 2-25, 2001).

CONCLUSION

A novel and effective 2D segmentation method has been disclosed for cine DENSE, where encoded myocardial motion is used to project a set of contours through time. The total user interaction in cine DENSE analysis is thus reduced to the manual demarcation of the myocardium on a single frame. The technique is solely based on the cine DENSE phase images, but the additional use of magnitude information holds promise for further automation. A radial segmentation error metric was introduced for short-axis data, and the resulting error for 6 slice-followed and 6 non slice-followed datasets is 0.13±0.12 and 0.21±0.15 pixels, respectively. The segmentation accuracy was similar to inter-observer variability. Motion-guided segmentation can be accurately achieved by employing the displacement-encoded phase shifts intrinsic to DENSE MRI to propagate a single set of pre-defined contours throughout the remaining cardiac phases.

The invention described herein may be automated by, for example, tangibly embodying a program of instructions upon a computer readable storage media, capable of being read by machine capable of executing the instructions. A general purpose computer is one example of such a machine. Examples of appropriate storage media are well known in the art and would include such devices as a readable or writeable CD, flash memory chips (e.g., thumb drive), various magnetic storage media, and the like.

The features of the invention have been disclosed, and further variations will be apparent to persons skilled in the art. All such variations are considered to be within the scope of the appended claims. Reference should be made to the appended claims, rather than the foregoing specification, as indicating the true scope of the subject invention.

What is claimed is:

1. A method for modeling tissue motion, comprising:
providing a plurality of digitized images of a portion of patient tissue, said plurality of digitized images comprising successive frames representing motion of said tissue;
performing spatiotemporal phase unwrapping of the frames;
calculating displacement vectors for all pixels of all frames;
defining a portion of the tissue at any one frame;
using a modulus deformation mask to remove all displacement vectors with deformation above a predetermined amount;
for the displacement vectors at each frame having deformation below said predetermined amount, finding a predetermined number of closest vector tails of said displacement vectors to each identified tissue position at time=0;
calculating how much each displacement vector differs from a mean magnitude and angle of the predetermined number of closest vector tails;

ignoring displacement vectors with an angle deviation greater than a predetermined number of radians and a predetermined magnitude deviation from the mean magnitude;

selecting the three closest vector tails of the remaining vector tails and using the three closest vector tails for a 2D interpolation;

representing trajectory position at each frame by a 2D Gaussian function with an area of unity and a standard deviation, and then obtaining a binary mask for each frame by thresholding the associated frame image at 0.5;

obtaining isocontours based on the binary images resulting from the binary mask;

designating the longest isocontour as an outer tissue portion and the second longest isocontour as an inner tissue portion; and smoothing the contours by fitting periodic functions as a function of arc length.

2. The method of claim 1, wherein the tissue comprises myocardium, the outer tissue portion comprises the epicardium, the inner tissue portion comprises the endocardium, and the step of calculating displacement vectors comprises using at least one of: (a) displacement coding with simulated echoes (DENSE), (b) speckle tracking, and (c) harmonic phase (HARP) tissue tracking techniques.

3. The method of claim 1, wherein the predetermined amount is greater than about 70% and the predetermined number of closest vector tails is 9.

4. The method of claim 1, wherein the predetermined number of radians is $\pi/6$ radians.

5. The method of claim 1, wherein the predetermined magnitude deviation is 0/7.

6. The method of claim 1, wherein the standard deviation is about 1.25 pixels.

7. The method of claim 1, further comprising applying active contour models to the binary images.

8. A machine readable storage device tangibly embodying a series of instructions executable by the machine to perform a series of steps, the steps comprising:

providing a plurality of digitized images of patient tissue, said plurality of digitized images comprising successive frames representing motion of said tissue;

performing spatiotemporal phase unwrapping of the frames;

calculating displacement vectors for all pixels of all frames;

defining a portion of the tissue at any one frame;

using a modulus deformation mask to remove all displacement vectors with deformation above a predetermined amount;

for the displacement vectors at each frame having deformation below said predetermined amount, finding a predetermined number of closest vector tails of said displacement vectors to each identified tissue position at time=0;

calculating how much each displacement vector differs from a mean magnitude and angle of the predetermined number of closest vector tails;

ignoring displacement vectors with an angle deviation greater than a predetermined number of radians and a predetermined magnitude deviation from the mean magnitude;

selecting the three closest vector tails of the remaining vector tails and using the three closest vector tails for a 2D interpolation;

representing trajectory position at each frame by a 2D Gaussian function with an area of unity and a standard deviation, and then obtaining a binary mask for each frame by thresholding the associated frame image at 0.5;

obtaining isocontours based on the binary images resulting from the binary mask;

designating the longest isocontour as an outer portion of said tissue and the second longest isocontour as an inner portion of said tissue; and smoothing the contours by fitting periodic functions as a function of arc length.

9. The machine readable storage device of claim 8, wherein the tissue comprises myocardium, the outer tissue portion comprises the epicardium, the inner tissue portion comprises the endocardium, and the step of calculating displacement vectors comprises using at least one of: (a) displacement coding with simulated echoes (DENSE), (b) speckle tracking, and (c) harmonic phase (HARP) tissue tracking techniques.

10. The machine readable storage device of claim 8, wherein the predetermined amount is greater than about 70% and the predetermined number of closest vector tails is 9.

11. The machine readable storage device of claim 8, wherein the predetermined number of radians is $\pi/6$ radians.

12. The machine readable storage device of claim 8, wherein the predetermined magnitude deviation is 0/7.

13. The machine readable storage device of claim 8, wherein the standard deviation is about 1.25 pixels.

14. The machine readable storage device of claim 8, further comprising applying active contour models to the binary images.

15. A system for modeling tissue motion, comprising:

means for providing a plurality of digitized images of said tissue, said plurality of digitized images comprising successive frames representing motion of said tissue;

means for performing spatiotemporal phase unwrapping of the frames;

means for calculating displacement vectors for all pixels of all frames;

means for defining a portion of the tissue at any one frame;

means for using a modulus deformation mask to remove all displacement vectors with deformation above a predetermined amount;

for the displacement vectors at each frame having deformation below said predetermined amount, means for finding a predetermined number of closest vector tails of said displacement vectors to each identified tissue position at time=0;

means for calculating how much each displacement vector differs from a mean magnitude and angle of the predetermined number of closest vector tails;

means for ignoring displacement vectors with an angle deviation greater than a predetermined number of radians and a predetermined magnitude deviation from the mean magnitude;

means for selecting the three closest vector tails of the remaining vector tails and using the three closest vector tails for a 2D interpolation;

means for representing trajectory position at each frame by a 2D Gaussian function with an area of unity and a standard deviation, and then obtaining a binary mask for each frame by thresholding the associated frame image at 0.5;

means for obtaining isocontours based on the binary images resulting from the binary mask;

means for designating the longest isocontour as an outer portion of the tissue and the second longest isocontour as an inner portion of the tissue; and means for smoothing the contours by fitting periodic functions as a function of arc length.

16. The system of claim 15, wherein the tissue comprises myocardium, the outer tissue portion comprises the epicardium, the inner tissue portion comprises the endocardium, and the step of calculating displacement vectors comprises using at least one of: (a) displacement coding with simulated echoes (DENSE), (b) speckle tracking, and (c) harmonic phase (HARP) tissue tracking techniques.

17. The system of claim 15, wherein the predetermined amount is greater than about 70% and the predetermined number of closest vector tails is 9.

18. The system of claim 15, wherein the predetermined number of radians is .pi./6 radians.

19. The system of claim 15, wherein the predetermined magnitude deviation is 0/7.

20. The system of claim 15, wherein the standard deviation is about 1.25 pixels.

* * * * *